P. U. DANIEL.
SIGNAL MECHANISM FOR VEHICLES.
APPLICATION FILED APR. 11, 1916.
1,201,564.
Patented Oct. 17, 1916.
2 SHEETS—SHEET 1.
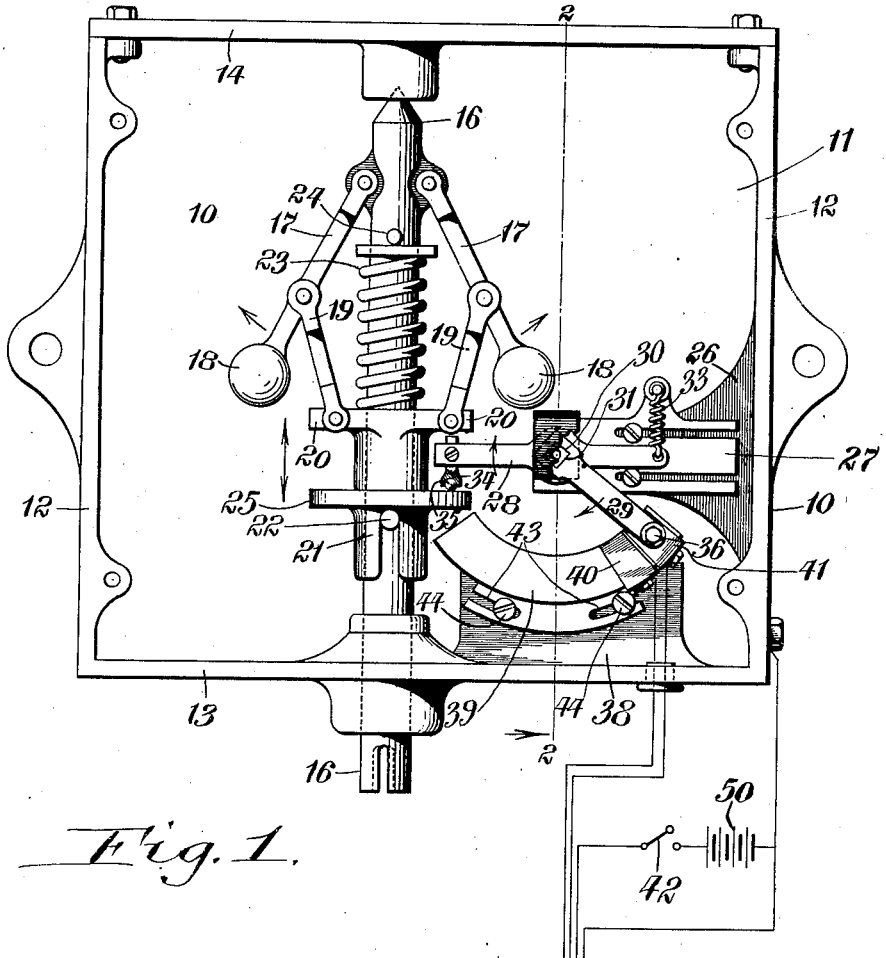
Fig. 1.
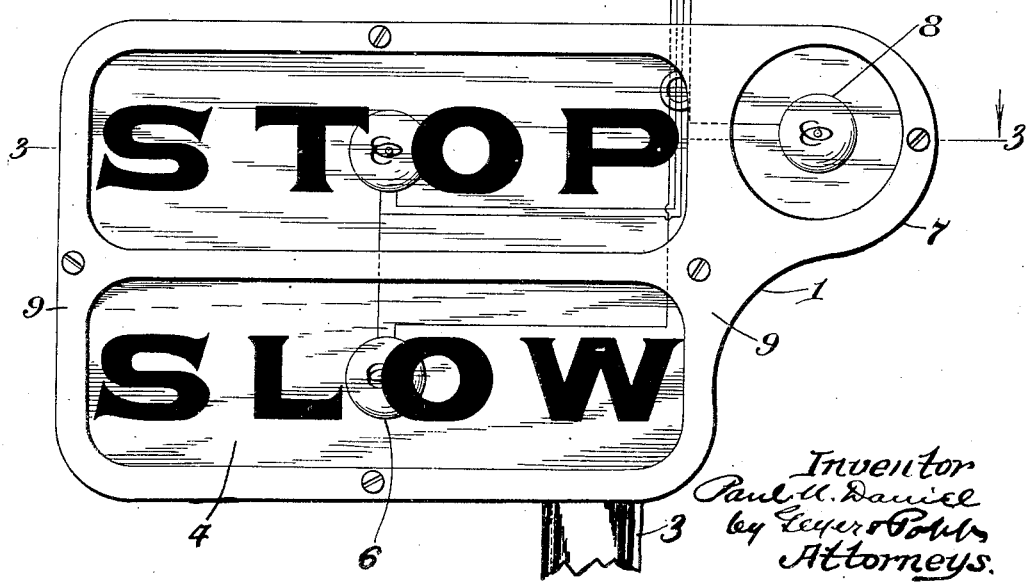
Inventor
Paul U. Daniel
by Geyer & Pohl
Attorneys.

P. U. DANIEL.
SIGNAL MECHANISM FOR VEHICLES.
APPLICATION FILED APR. 11, 1916.
1,201,564.
Patented Oct. 17, 1916.
2 SHEETS—SHEET 2.
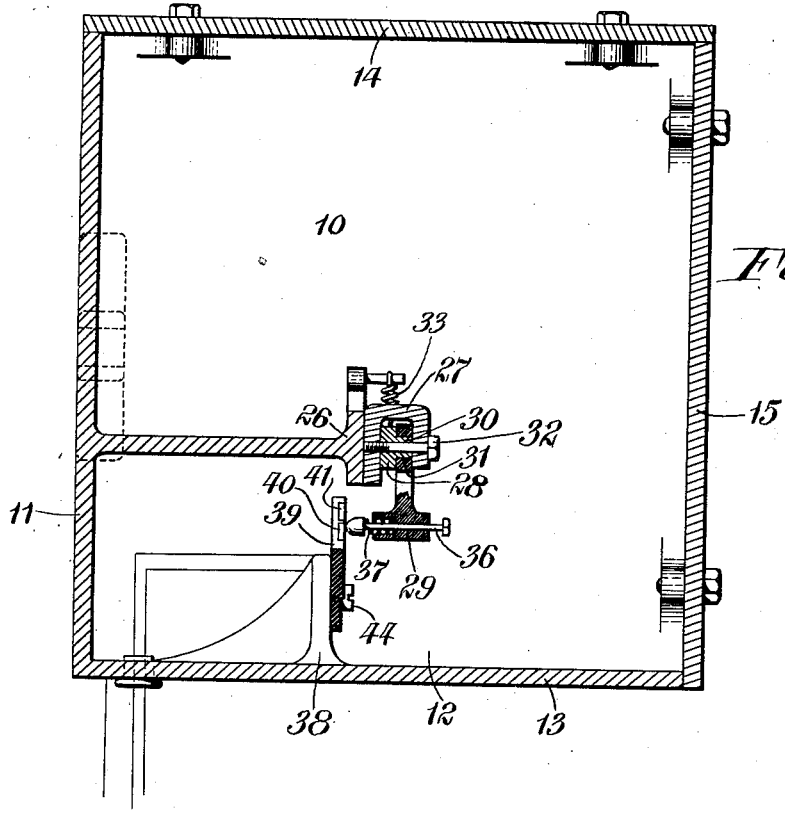
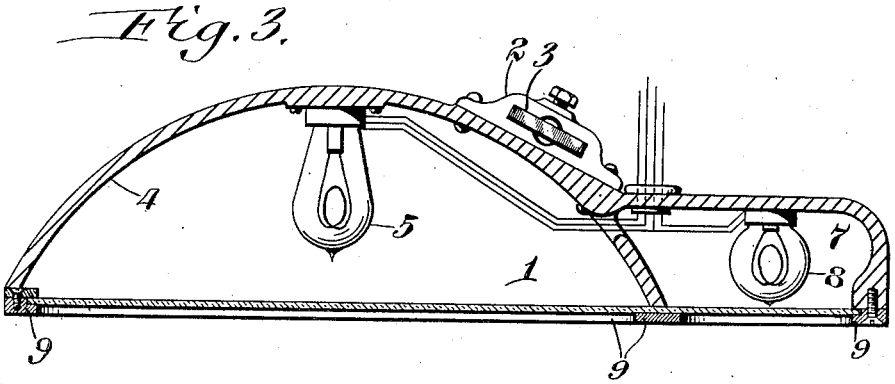
Inventor
Paul U. Daniel
by Leeper & Popp
Attorneys.

UNITED STATES PATENT OFFICE.

PAUL U. DANIEL, OF BUFFALO, NEW YORK, ASSIGNOR TO INTERNATIONAL AUTOMATIC APPLIANCE COMPANY, OF BUFFALO, NEW YORK, A CORPORATION OF NEW YORK.

SIGNAL MECHANISM FOR VEHICLES.

1,201,564. Specification of Letters Patent. Patented Oct. 17, 1916.

Application filed April 11, 1916. Serial No. 90,375.

*To all whom it may concern:*

Be it known that I, PAUL U. DANIEL, a citizen of the United States, residing at Buffalo, in the county of Erie and State of New York, have invented new and useful Improvements in Signal Mechanism for Vehicles, of which the following is a specification.

This invention relates to a signal mechanism for vehicles which is more particularly designed for use on the rear part of vehicles, such as automobiles and the like and which will automatically illuminate different signal lamps at different predetermined speeds of the vehicle.

The object of the invention is to provide an automatic signal or warning which will enable an auto which is coming toward the rear of another to be informed how the auto in front is altering its speed, more particularly when the road is dark and consequently dangerous.

In the accompanying drawings: Figure 1 is a view of the entire signal including the wiring system and with the cover of the governor box removed. Fig. 2 is a vertical longitudinal section of said governor box taken on line 2—2, Fig. 1. Fig. 3 is a horizontal longitudinal section of the light frame, taken on line 3—3, Fig. 1.

Similar characters of reference indicate corresponding parts throughout the several views.

1 represents a lighting frame or casing adapted to be suitably mounted at the rear of an automobile or other vehicle so as to enable a driver in the rear of said vehicle to obtain a clear vision of the same. This may be accomplished in any desirable manner but, as shown, a slotted block 2 is firmly secured to said lighting frame and adapted to engage a tang 3 which is secured to the vehicle between the rear wheels thereof in the usual and well known manner. The lighting frame may be of any suitable form but preferably the same is constructed as follows: 4 represents a dished or bowl-shaped receptacle or reflector to the forward face of which are secured both a stop electric lamp 5 and a slow electric lamp 6. At one longitudinal end of the receptacle is formed a pocket 7 which is adapted to receive a constant electric lamp or tail light 8. To the forward edge of the combined receptacle and pocket is secured a glass plate retainer 9. In its preferred construction, two separate plates or panes of glass are secured to this retainer, an upper red glass which covers both the stop and the steady or tail lamps and a lower plain white glass which is illuminated by only the slow lamp. On the upper or red glass is formed in bold print in front of the stop lamp 5 the word "Stop" and across the face of the lower plain glass is formed the word "Slow."

The purpose of this invention is to cause the stop lamp 5 to light up whenever the speed of the vehicle drops below say five miles an hour and to cause the slow lamp to light up only whenever speed is say from five to ten miles an hour.

While the constant lamp 8 may be omitted entirely, its use in combination with the other lights is to be desired, this bulb gleaming constantly through the upper red glass and if desirable it may be caused to also illuminate a number or license plate, secured to the vehicle or to the lighting frame in any suitable position.

Secured to the vehicle at some suitable point is a governor box or frame 10 which may be of any desirable form but preferably consists of a rear wall 11, side walls 12, 12, a bottom 13, a detachable top 14 and a detachable front wall 15. Journaled in said governor frame is a vertical governor shaft 16. This shaft may be connected with any one of the driving wheels or other suitable moving part of the vehicle in any suitable manner, so that the speed of this shaft may always vary proportionately to the speed of the vehicle. Any suitable governor may be mounted on this shaft but the fly ball type shown is simple, satisfactory and preferred and is constructed as follows: Pivotally connected at their upper ends to the upper end of the governor shaft are two inclined ball or weight levers 17 which are pivoted to swing radially away from the governor shaft. To the lower end of each of said ball levers 17 is secured a fly ball 18 which, as it spins around the governor shaft, causes its companion ball lever to rise. Near the lower end of each of said ball levers is pivotally connected a depending link 19, and the lower ends of said links are pivotally connected to two lugs 20 which are formed on the upper end of a sleeve 21 which slides vertically on the governor shaft 16. The downward movement of this sleeve is limited by the stop pin 22 which also acts as a feather pin or spline preventing said sleeve from rotating on the shaft in any position which said sleeve may assume. Any upward movement of the sleeve is opposed by a compression spring 23 arranged around the governor shaft between the upper face of said sliding sleeve 21 and the lower side of a spring pin 24 which is driven into the governor shaft. Thus the height to which said sliding sleeve may rise depends on the speed of the governor shaft. The sleeve near its lower end is provided with a laterally extending annular flange 25.

Formed on one of the vertical walls of the governor frame is a horizontally extending bracket 26 and adjustably secured thereto is a carriage plate 27 which is capable of lateral adjustment relative to the governor shaft. Pivoted to the inner end of the carriage plate so as to swing in a vertical plane is a switch lever comprising a switch bar 28 and a switch arm 29 both of which move as a unit around a pivot 32 in the carriage plate, being caused to move together by providing said bar 28 with a square, forwardly projecting lug 30 about midway of its length and by providing said arm 29 with a square socket 31 adapted to receive said square lug. Preferably the upper inner corner of the carriage plate extends forwardly and laps over the arm and the bar, thus enabling the pivot 32 around which the whole lever swings to be supported on both sides of said lever. The inner end of the switch lever rides on the upper surface of the annular flange 25 of the sleeve and the other end is yieldingly pulled upwardly by an extension spring 33 which is connected at its upper end to the carriage plate 27. Thus, as the sliding sleeve 21 rises and falls, the switch lever is caused to swing back and forth in unison with the sleeve. To lessen the friction at the point where the inner end of the switch lever constantly gears against the upper face of the rotating flange 25, a rod 34 is secured adjustably in the inner end of said lever and in the lower end of said rod is mounted an imprisoned bearing ball 35. When this ball has worn out or flaked off a groove in the upper surface of the annular flange a new surface may be presented to the ball by adjusting the carriage plate 27 relatively to the bracket 26. The lower end of the switch lever is provided with a brush plunger 36 which is able to move horizontally relative to the switch lever and is yieldingly pressed rearwardly by means of a compression spring 37, whose forward end bears against the switch lever.

Projecting upwardly from the bottom wall of the governor frame is a transverse wall 38 to which is adjustably secured a segment plate or block 39 preferably formed entirely of insulating material. This adjustment is preferably accomplished by providing said block with two curved slots 43 which are concentric with the pivot of the switch arm, or substantially so. Two clamping screws 44 are adapted to pass through said slots 43 and into said transverse wall enabling said plate to be secured to said wall, the arcuate adjustment of the plate thereby being concentric to the described path of the brush plunger 36. Near the outer end of this block or plate are embedded two metallic contact segments 40 and 41 and in the position shown in the drawings, the switch lever is over contact 41. In this position, with the main switch 42 closed, the current will be closed through the stop lamp 5, one terminal of which is electrically connected to the switch lever through the current generator 50, the other terminal being connected directly with said segment. Now if the vehicle speeds up say somewhat above five miles per hour, the circuit through the stop lamp or bulb will be broken and a new circuit through the slow lamp or bulb established so that said slow lamp or bulb will continue burning until a speed of say over 10 miles an hour is gained when all circuits would be broken except that through the constant lamp 8 which gleams constantly irrespective of the governor or the switch lever.

Assuming that the vehicle is traveling at dusk along the road at an ordinary rate of speed and that the main switch 42 is closed the constant lamp 8 will be lighted and the current will be turned on which lights the signal lamps. As the speed of the vehicle decreases below say ten miles an hour the lower "slow" sign is illuminated due to the dropping of the governor balls 18 which permit the sliding sleeve 21 to be depressed and the switch arm 29 to engage with the contact segment 40. Then as the speed decreases below say five miles per hour, the "slow" sign lamp 6 is turned off and the "stop" sign is illuminated due to the passing of the switch arm 29 from said contact segment 40 to the contact segment 41. Then if the speed is increased again to a normal running speed of above say ten miles per hour, all the lights, except the constant lamp 8 will be again turned off. It is well known that distances at night are extremely deceiving but there can be little excuse for a rear end collision if suddenly the car ahead shows a "slow" sign and a few moments later a "stop" sign.

It is apparent that the operation of this signal is entirely automatic beyond the operation of the main switch 42 which switch must be present even if the simplest form of tail lamp is used. Even though the wording of the signs cannot be read, the sudden flashing of first a white then a red light is ample notice to the driver of the oncoming rear car that the car in front is stopping and the operation of the lamps being absolutely automatic, cannot act erratically because of carelessness or thoughtlessness. Ample adjustment is provided for wear and speed adjustment, the entire device is durable, accessible and compact and may be constructed at low cost.

I claim as my invention:

1. A signal mechanism for vehicles comprising a governor frame, a source of electricity, a governor journaled in said frame and connected with a movable part of the vehicle, a number of contact segments secured to said frame and electrically insulated from each other, a switch lever pivoted to said frame and connected with said governor and adapted to sweep over the faces of said segments so as to close the electrical circuit through any one or any group of the same, and a number of signal lamps individually connected electrically to said segments and collectively connected electrically with the switch lever.

2. A signal mechanism for vehicles comprising a source of electricity, a governor frame mounted on the vehicle, a governor journaled in said frame and connected with a movable part of the vehicle, a segment block adjustably secured to said frame, a contact segment arranged on the block, a switch lever connected with said governor and pivoted to said frame and adapted to sweep over the face of said segment, a signal lamp having its opposite terminals connected electrically with said segment and said switch lever, and means for locking said segment block to the frame after having tangentially adjusted said block relative to the switch lever so as to cause the electric circuit to be closed at the desired rate of speed.

3. A signal mechanism for vehicles comprising a source of electricity, a governor frame, a governor journaled in said frame and provided with a flanged sleeve, a carriage plate adjustably secured to said frame, a contact segment secured to said frame, a switch lever pivoted to said plate and adapted to close the circuit by making contact with said segment, an electric lamp connected with said segment and with said lever, and means for locking said plate to said frame after having adjusted said block radially relative to the axis of the governor so as to obtain new wearing surfaces between the governor sleeve and the switch arm.

PAUL U. DANIEL.